Aug. 28, 1934.   I. J. McGUIRE   1,971,459
AUTOMATIC DRAIN VALVE
Filed Aug. 17, 1933

Inventor
IRVING J. McGUIRE,
By James N. Cyples
Attorney

Patented Aug. 28, 1934

1,971,459

UNITED STATES PATENT OFFICE 1,971,459

AUTOMATIC DRAIN VALVE

Irving J. McGuire, Dolgeville, N. Y.

Application August 17, 1933, Serial No. 685,628

7 Claims. (Cl. 137—34.3)

This invention relates to an improvement in automatic drain valves, and has particular reference to such valves adapted for use in connection with motor vehicle cooling systems, though of course not restricted to this use.

It is the primary object of the present invention to provide a valve so constructed as to be automatically actuated upon a lowering of the temperature to a point at which the fluid in the cooling system may freeze, such actuation promptly and quickly draining the system.

An extremely important object of the invention resides in means associated with the valve for causing a release thereof just prior to the time when the water in the system has started to freeze.

A further and important object of the invention resides in providing insulating means for the valve chamber, whereby actuation of the valve is assured against the freezing action of the water.

Another object is the extreme simplicity of construction and operation, the device being positive and rapid in its action at all times, is cheap to manufacture, is strong, durable and a constant protective means for the cooling system.

Other important objects and advantages of the invention will present themselves during the course of the following description, reference being had to the accompanying drawing, wherein:—

Figures 1, 2:
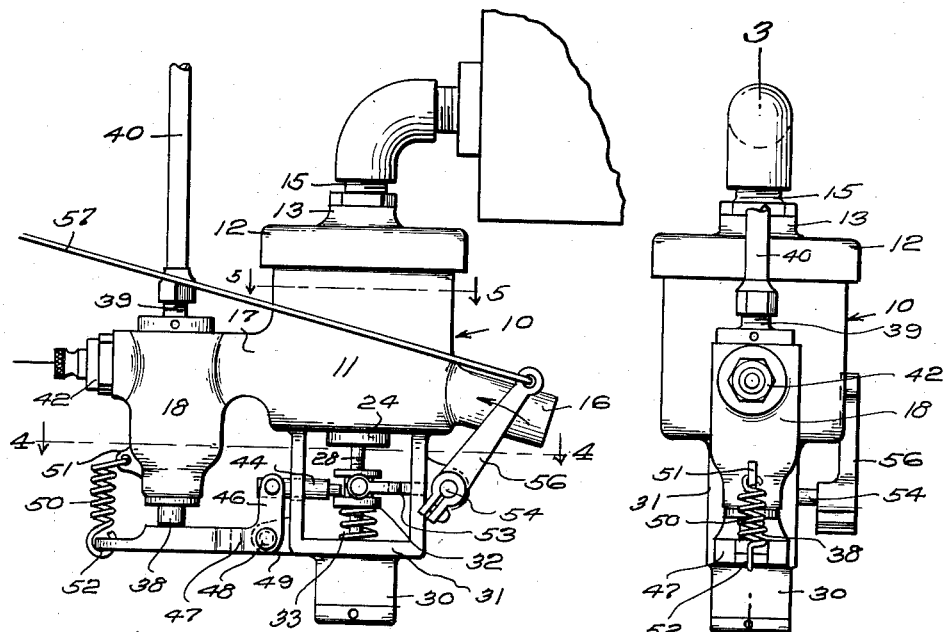
Figure 1 is a side elevational view of a valve constructed in accordance with the invention.
Figure 2 is an end view.

Referring specifically to the drawing, the numeral 10 designates the valve structure as a whole, embodying a valve chamber 11 of cylindrical formation open at its upper end and exteriorly threaded for the reception of a threaded closure cap 12. The cap 12 has a centrally arranged upstanding boss 13 that is provided with an internally threaded bore 14 for the reception of a threaded coupling member 15 adapted to have connection with the lower end of the usual cooling radiator employed in connection with automobile cooling systems. It will be obvious however that the connection may be with any system wherein protection against freezing is desired.

Figures 3, 5:
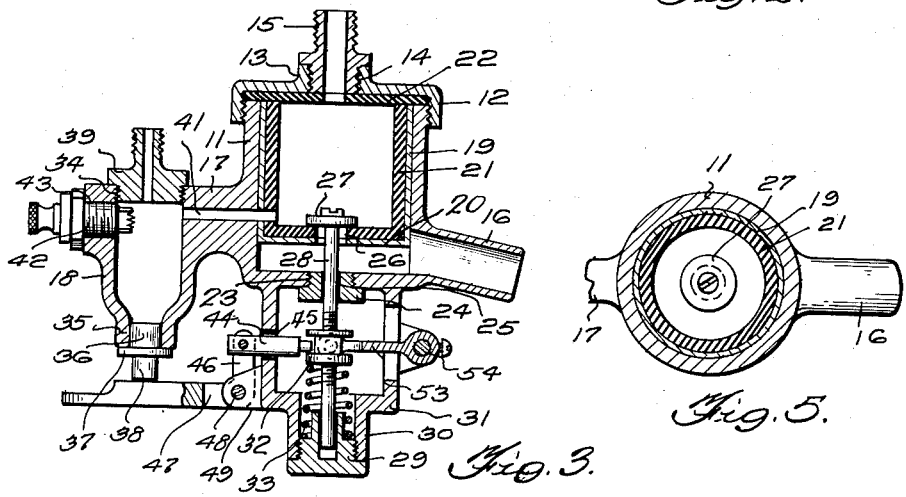
Figure 3 is a vertical sectional view thereon on line 3—3 of Fig. 2.
Figure 5 is a section on line 5—5 of Fig. 1.
Figure 4:
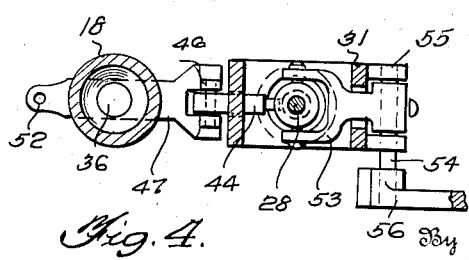
Fig. 4 is a section on line 4—4 of Fig. 1.

The valve chamber 11 is provided with a discharge spout 16 upon one side, and a lateral extension 17 upon the opposite side terminating in a relatively small tubular chamber 18. The valve chamber 11, see Figure 3, is provided with an inner shell 19, having an open upper end terminating flush with the upper end of the chamber, and a closed lower end 20, spaced from the lower end of the chamber. The shell 19 has its side walls and end wall covered by a relatively heavy sheet of insulating material 21 such as rubber. This rubber is securely attached to the shell 19 by a suitable rubber to metal process. The shell 19 is rigidly held in the chamber 11 with its lower end in spaced relation, by any suitable means, such as sweating. The cap 12 likewise is provided with a similar lining of insulation 22. The insulation 22 has a central opening communicating with the coupling 15.

The lower end of the chamber 11 has a centrally arranged screw threaded port 23, receiving a threaded plug guide 24 having a bore 25. The lower end 20 of the shell and its covering of insulation is provided with a port 26 adapted to be covered and uncovered by a disc valve 27 carried by a stem 28. The stem 28 extends downwardly and has its lower end operating in a plug guide member 29, threaded into a depending boss 30 formed upon a U-shaped guide bracket 31, preferably cast integral with the chamber 11. The stem 28 is threaded for a portion of its length and carries an adjustable grooved collar 32. A compressible coil spring 33 bears between the guide 29 and the collar 32 for normally urging the stem upward for unseating the valve 27.

The chamber 18 is formed open at its upper and lower ends as at 34 and 35. The lower end 35 is relatively smaller than the end 34 and has a smooth cylindrical bore adapted to receive a cylindrical plug 36 having a head 37 and a projecting end 38. The plug is adapted to have a comparatively snug sliding fit within the bore 35, sufficient to prevent the leakage of water.

The upper end of the chamber 18 is threaded for the reception of a coupling member 39 adapted to have connections with a tube 40 leading to a point in the cooling system adjacent the flexible connection between the engine and upper end of the radiator. The chamber 18 has constant communication with the interior of the chamber 11 through the medium of a port 41. A suitable electrical heating element 42 is connected in a threaded opening 43 in the side wall of the chamber 18.

Means are provided to latch the valve 27 in closed position against the action of the spring 33, comprising a sliding bolt 44 operating through an opening 45 in one leg of the bracket 31, and has its free or inner end normally engaging in the groove of the collar 32. The outer end of the bolt 44 has pivotal connection with the short arm 46 of a bell crank lever 47, in turn adapted to rock upon a shaft 48 journaled in bearings 49 carried by bracket 31. The long arm of the lever 47 underlies, and normally bears against the extension 38 of plug 36, and is held thereagainst by a retractile coil spring 50, connected with the chamber 18 and lever 47, as indicated at 51 and 52.

Upon a release of the valve 27 for draining it, it becomes necessary to provide means for again forcing the valve to closed and latched position, and to accomplish this, a forked lever 53 carried upon a rock shaft 54 is provided with inwardly extending fingers engageable in the groove of the collar 32. The shaft 54 is journaled in brackets 55, and carries at its outer end an operating lever 56 having a wire or cable 57 attached thereto. The cable 57 preferably extends to a suitable operating button (not shown) that may be located upon the conventional instrument panel of the vehicle. It is therefore obvious that a pull upon the cable 57 will rock the shaft 54 for swinging the lever 53 downwardly, resulting in the valve being reset to latched position.

The operation of the device is as follows:

Assume the device to be connected with the lower drain coupling of the radiator, as indicated in Figure 1, and all parts in their normal or closed position and the cable 57 extended to the instrument panel. The use of the tube 40 will insure of a complete circulation of the fluid in the system to thereby maintain the chambers 11 and 18 filled at all times.

When the temperature reaches the point of freezing, the relatively small body of water in the chamber 18 will naturally freeze first, and the expansion caused by the freezing will force the plug 36 outwardly, acting to rock the lever 47 and withdrawing the bolt 44 from engagement with the collar 32. Spring 33 will then immediately project the valve 27 upward from its seat and permit the water in the chamber 11 and the cooling system to drain outwardly through the port 26 and discharge through nozzle 16. It is highly important that the insulation 21 be provided as means to insure against possible freezing of the liquid in the chamber 11 which would naturally interfere with the operation of the valve. The shell 19 and its permanently attached insulation may be manufactured and installed at assembly with a minimum of labor and cost, and greatly facilitates the manufacture of the device in that it not only provides the spaced lower end for the chamber, but further the rubber to metal process is best accomplished by using brass or copper, while the valve structure, as a whole, is preferably constructed of aluminum or aluminum alloy.

After the system has been drained, it later becomes necessary to close the valve for a refilling of the system. Since the chamber 18 still retains its ice, it first becomes necessary to again liquefy it in order to permit the bolt to be projected to latching position. Current is then passed through the heating unit 42 by operation of a suitable switch, causing the ice to melt and permitting the spring 50 to move the lever 47 upward to again force the plug 36 into its bore and the bolt simultaneously projected to latching position. A pull upon the cable 57 by the operator in the direction of the arrow forces the valve downward to its seat and permits the bolt 44 to engage and hold the collar and stem against the pressure of the spring 33.

It will be seen from the foregoing that an extremely simple and efficient valve structure has been provided. The parts are all simple and easily assembled, and of such construction as to normally be free from disarrangement. The lever 47 may be pressed downward by the finger of the operator, should it be desired to drain the system, as frequently occurs in warm weather in cleaning the radiator.

It is to be understood that the invention is not limited to the precise construction set forth, but that it includes within its purview whatever changes fairly come within either the terms or the spirit of the appended claims.

Having described my invention, what I claim is:

1. A fluid drain valve comprising a valve chamber having a valve seat, a valve positioned in the chamber for engagement with the seat, a freeze chamber carried by the valve chamber and of a relatively small size, spring means for projecting the valve to unseated position, a latch adapted to retain the valve in seated position, means operable under the expansive influence of a body of freezing liquid in the freeze chamber for releasing the latch, and means for restoring the valve to seated position and the latch to latched position.

2. A fluid drain valve for connection to a water system comprising a valve casing having a valve seat, a valve engageable with the seat and carried by a valve stem extending outwardly of the casing, means for insulating the casing against freezing, a freeze chamber carried by the valve casing and of relatively small size, a plug operable in said chamber, a latch for retaining the valve seated, said plug serving to release the latch under the expansive influence of a body of freezing liquid carried in said chamber, and manual resetting means for the said valve.

3. A fluid drain valve for the cooling system of motor vehicles comprising a valve casing having fluid connection with such system, a discharge nozzle carried by the casing, a valve seat in said casing engageable by a valve, insulating means against freezing carried by the casing, a stem carried by the valve and projecting outwardly of the casing, a grooved collar carried by the stem, a latch engageable with the collar for retaining the valve in seated position, a spring for projecting the valve to unseated position, a freeze chamber of relatively small size carried by the casing and having fluid communication therewith, a fluid inlet pipe connected with said chamber and with the fluid cooling system for maintaining fluid in said chamber, said chamber open at its lower end and normally closed by a slidable plug, said plug adapted to be projected under the action of the expansive influence of the freezing of said liquid in the chamber for releasing said latch, and manual resetting means for said valve.

4. A drain valve of the character described for connection with the cooling system of motor vehicles comprising a valve casing having fluid connection with the drain coupling of such system, a discharge nozzle for said casing, a valve seat in said casing, a valve for engagement with the seat, an outwardly extending stem on said valve, a bracket carried by said casing, guides for said stem carried by the bracket and the casing, a spring for projecting the valve to open position, a collar carried on the stem, a latch engageable with the collar for normally holding the valve in closed position, a resetting lever engageable with the collar, insulating means for the said casing, a freeze chamber carried by the casing and having fluid communication therewith, said chamber open at its lower end and normally closed by a slidable plug, a lever for operating the latch, said lever actuated by the plug in its sliding movement under the action of the expansion of a freezing liquid in the chamber, fluid connection between the chamber and the system, and heating means for the chamber.

5. A fluid drain valve for the cooling system of motor vehicles comprising a casing having a cover and a discharge nozzle, a fluid coupling connection between the casing and the drain connection of the system, a shell arranged in said casing with its bottom in spaced relation to the bottom of the casing, the inner walls and bottom of said shell covered by a sheet of relatively heavy insulating material permanently secured thereto, insulating material secured to the inner face of said cover, a port formed in the bottom of said shell and said insulation, an opening formed in the bottom of said casing and in alignment with the port, a valve within the shell adapted to close the port, a stem carried by the valve and projecting outwardly of the casing through its opening, said nozzle communicating with the casing below the bottom of the shell, latch means for the stem for normally holding the valve in closed position, projection means tending to move the valve to open position, a freeze chamber, a fluid conduit between the chamber and interior of the shell, fluid connection between the chamber and the system, and means operable by the freezing action of fluid in the chamber for releasing the latch.

6. A fluid drain valve for cooling systems comprising a valve casing and a freeze chamber, fluid connections between the valve casing and freeze chamber and the cooling system for maintaining circulation therein, an inner shell carried by the valve casing and having a port in its lower end, insulation permanently attached to the walls and bottom of the shell and having an aligned port, a closure cap for the upper end of the valve casing and likewise having a sheet of insulation, a port formed in the cap and insulation for the said fluid connections, a bracket carried by the casing, a valve operable in said shell and adapted to normally close the first named port, a stem carried by the valve and projecting outwardly of the casing, guide means for the stem carried by the casing and the bracket, a combined shifting and latch collar carried by the stem, the latch adapted to normally hold the valve in closed position, a spring for projecting the valve to open position, projection means carried by the freeze chamber and operable under the expansive influence of a freezing liquid therein, said projection means operating to release said latch, electrical heating means for melting the frozen fluid in the freeze chamber, and a drain nozzle for the casing.

7. A device of the character described comprising a relatively large valve casing and a relatively small freeze chamber, fluid connections adapted to connect the casing and the chamber with a cooling system, a fluid conduit between the casing and the chamber, a discharge nozzle for the casing adjacent its lower end, a shell rigidly secured in the casing and having a lower end wall in spaced relation to the bottom of the casing, a closure cap for the casing and shell, a relatively heavy covering of rubber permanently secured to the inner walls and bottom of the shell and the inner surface of the cap, aligned ports formed in the cap, the bottom wall of the shell and insulation and in the bottom wall of the casing a valve stem operable through the ports of the shell and casing and provided with a valve operable in the shell and adapted to close the opening therein, spring projecting means for unseating the valve, guide means for the stem, latch means for retaining the valve in closed position, means operable under the expansive influence of a body of freezing liquid in said chamber for releasing the latch, heating means for melting the frozen liquid, and manual means for restoring the valve to latched position after the liquid has been melted.

IRVING J. McGUIRE.